US012440776B2

(12) United States Patent
Schell et al.

(10) Patent No.: US 12,440,776 B2
(45) Date of Patent: Oct. 14, 2025

(54) DEVICES, SYSTEMS, AND METHODS FOR ENHANCING THE GAMEPLAY OF TOY

(71) Applicant: Schell Games LLC, Pittsburgh, PA (US)

(72) Inventors: Jesse Schell, Pittsburgh, PA (US); David Purta, Pittsburgh, PA (US); Eric Policaro, Pittsburgh, PA (US)

(73) Assignee: Schell Games LLC, Pittsburgh, PA (US)

( * ) Notice: Subject to any disclaimer, the term of this patent is extended or adjusted under 35 U.S.C. 154(b) by 514 days.

(21) Appl. No.: 18/061,941

(22) Filed: Dec. 5, 2022

(65) Prior Publication Data

US 2023/0173400 A1 Jun. 8, 2023

Related U.S. Application Data

(60) Provisional application No. 63/285,779, filed on Dec. 3, 2021.

(51) Int. Cl.
*A63H 30/04* (2006.01)
*A63F 9/14* (2006.01)
(Continued)

(52) U.S. Cl.
CPC .............. *A63H 30/04* (2013.01); *A63F 9/143* (2013.01); *A63F 9/24* (2013.01); *A63H 17/268* (2013.01);
(Continued)

(58) Field of Classification Search
CPC ...................................................... A63H 30/04
See application file for complete search history.

(56) References Cited

U.S. PATENT DOCUMENTS 8,085,136 B2 12/2011 Stewart et al.
8,216,036 B2 7/2012 Eyzaguirre et al.
(Continued)

FOREIGN PATENT DOCUMENTS

| KR | 20100119271 A | * 11/2010 | ......... G06K 7/10237 |
| RU | 2709562 C1 | * 12/2019 | ............. A63H 30/04 |
| WO | 2019087019 A1 | 5/2019 | |

OTHER PUBLICATIONS

RU-2709562-C1 English Translation (Year: 2010).*
(Continued)

*Primary Examiner* — Kyle R Grabowski
(74) *Attorney, Agent, or Firm* — K&L Gates LLP

(57) ABSTRACT

Devices, systems, and methods of enhancing the gameplay of a toy are disclosed herein. For example, the toy can be a remotely controlled vehicle that includes a radio frequency identification ("RFID") reader, configured to detect signals generated by a plurality of markers with RFID tags. Each marker of the plurality can be arranged such that the markers define a course for the remotely controlled vehicle. Certain markers can be designated as a starting line, a finish line, and "special," which would enable programmable and variable gameplay features and actions of the remotely controlled vehicle. The remotely controlled vehicle can be communicably coupled to a mobile computing device configured to receive and process signals from the vehicle, display metrics associated with the gameplay, enable immediate functioning of special tag features, display metrics, and generate control codes transmitted to the vehicle, which control certain features in accordance with the programmed gameplay.

27 Claims, 9 Drawing Sheets

(51) Int. Cl.
   *A63F 9/24* (2006.01)
   *A63H 17/26* (2006.01)
   *A63H 17/28* (2006.01)
   *A63H 17/395* (2006.01)
   *A63H 17/42* (2006.01)

(52) U.S. Cl.
   CPC .......... *A63H 17/28* (2013.01); *A63H 17/395* (2013.01); *A63H 17/42* (2013.01); *A63F 2009/2489* (2013.01)

(56) References Cited

U.S. PATENT DOCUMENTS

| | | |
|---|---|---|
| 9,283,472 B2 | 3/2016 | Platzer |
| 9,330,203 B2 | 5/2016 | Rosen et al. |
| 9,916,772 B1 | 3/2018 | Schell et al. |
| 2006/0183405 A1* | 8/2006 | Mathews ............... A63H 30/04 |
| | | 446/456 |
| 2006/0229843 A1 | 10/2006 | Freifeld |
| 2008/0026671 A1 | 1/2008 | Smith et al. |
| 2018/0036632 A1* | 2/2018 | Poynter ............... A63F 9/24 |
| 2018/0221781 A1* | 8/2018 | Green ............... A63K 1/00 |
| 2019/0314705 A1 | 10/2019 | Hansen |
| 2020/0061481 A1 | 2/2020 | Payne et al. |
| 2020/0148254 A1 | 5/2020 | Magrath, III |

OTHER PUBLICATIONS

Comparesoft https://web.archive.org/web/20210927190145/https://comparesoft.com/assets-tracking-software/rfid-asset-tracking/active-rfid-vs-passive-rfid-tags/ (Year: 2011).*

International Search Report and Written Opinion for International PCT Application No. PCT/US2022/080877, dated Mar. 15, 2023.

* cited by examiner

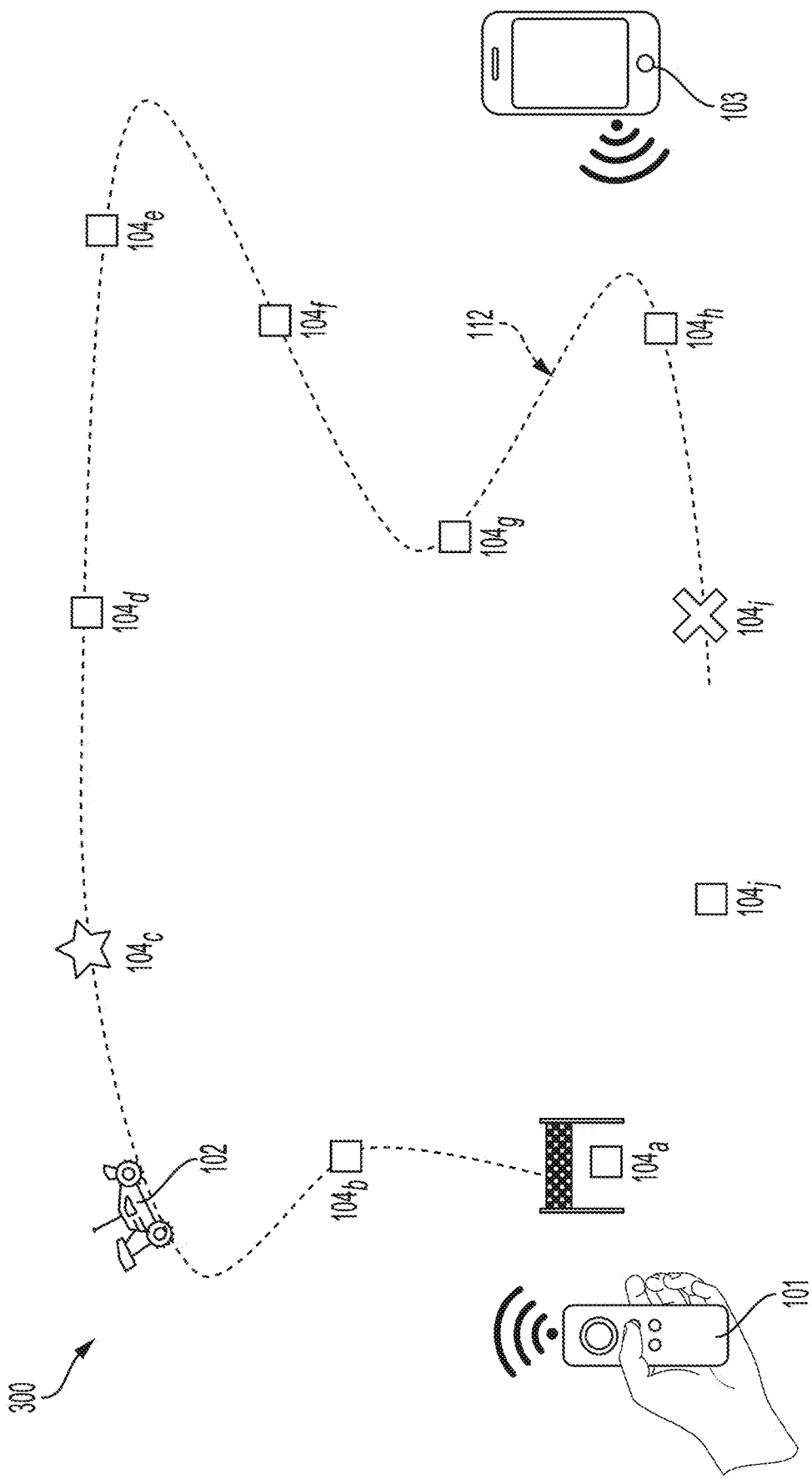

DEVICES, SYSTEMS, AND METHODS FOR ENHANCING THE GAMEPLAY OF TOY

CROSS-REFERENCE TO RELATED APPLICATION

This application claims the benefit of U.S. Provisional Patent Application No. 63/285,779 filed Dec. 3, 2021, entitled "DEVICES, SYSTEMS, AND METHODS FOR ENHANCING THE GAMEPLAY OF TOY," the contents of which is herein incorporated by reference in its entirety.

BACKGROUND

As entertainment becomes increasingly abundant and immediately available, consumers' attention has become a coveted commodity. Indeed, the "attention economy" has influenced modern recreation in dramatic ways, as companies compete for consumers' attention and strive for engagement optimization. For example, most people carry smart phones—which are essentially, advanced gaming systems—everywhere they go. As video games become more prevalent, children and adults alike continue to forego traditional hobbies and toys, such as a remotely controlled vehicle, for example. This is understandable, as video games offer numerous modes of gameplay featuring different objectives, hazards, and courses, all of which are specifically designed to capture and retain a user's attention. Nonetheless, many consumers remain nostalgic for the physical toys they played with growing up. There have been attempts to integrate the aforementioned features of a video game into a physical toy, such as a remotely controlled vehicle. However, such attempts, such as augmented reality, generally require expensive software development and integration with auxiliary equipment which increases the cost of the toy and hinder consumer adoption and limit engagement.

SUMMARY

In one general aspect, the present invention is directed to a system of enhancing the gameplay of a toy. For example, the toy can be a remotely controlled vehicle that includes a radio frequency identification ("RFID") reader, configured to detect signals generated by a plurality of markers with RFID tags. Each marker of the plurality can be arranged such that the markers define a course for the remotely controlled vehicle. Certain markers can be designated as a starting line, a finish line, or as "special" markers. "Special" markers can enable programmable and variable gameplay features and actions for the remotely controlled vehicle. The remotely controlled vehicle can be communicably coupled to a mobile computing device with which it can exchange data. The mobile computing device can be configured to process data from the remotely controlled (RC) vehicle. Data processing can direct programmable gameplay such as the immediate functioning of special tag features and the display of metrics associated with the gameplay such as a particular scoring of points. The processing of this data can also generate control codes which can be transmitted back to the remotely controlled (RC) vehicle to control certain features such as sound effects, steering, throttle, braking and game modes.

A method of playing a game with a remote control vehicle is disclosed herein. The method can include using a plurality of markers, and each marker of the plurality can include a RFID tag configured to generate a signal. Furthermore, the remote controlled vehicle can include a RFID reader configured to detect the signal generated by the RFID tag of the markers. The method can include: arranging the markers according to a user-defined course and using an application accessed via a computing device to define a sequence by which the RFID reader of the remote controlled toy must detect each signal generated by each RFID tag of the markers. The sequence can therefore, define a path for the vehicle through the course. After arranging the markers according to the course and defining the path, the method can further include controlling the remote control vehicle along the path such that the RFID reader detects each signal generated by each RFID tag of the markers in accordance with the defined sequence. The application can track the vehicle's progress through the path for the course based on the RFID reader's detection of each signal generated by each RFID tag of each marker and can determine that the vehicle has completed the path for the course.

FIGURES

Various embodiments are described herein by way of example in connection with the following figures, wherein:

FIG. 4 illustrates a block diagram of the system of FIG. 1 according to another non-limiting aspect of the present disclosure;

DESCRIPTION

The present invention is directed, in various embodiments, to devices, systems, and methods for enhancing the gameplay of a toy, such as a remote control vehicle. Accordingly, the devices, systems, and methods disclosed herein can be applied to many different types of remotely controlled vehicles, including cars, planes, drones, helicopters, and/or boats, amongst others. Additionally, a "remotely controlled vehicle" shall not be limited to recreational applications, and embodiments of the present invention can be applicable any remotely controlled vehicle that could benefit from markers, or tags, that are used to define a course of travel. Likewise, "toy" is broadly implemented throughout the present disclosure. Accordingly, a "toy" can include non-motorized toys, such as bicycles, skateboards, roller skates, jump ropes, frisbees, footballs, baseballs, sneakers, shoes, etc.

Figure 1:
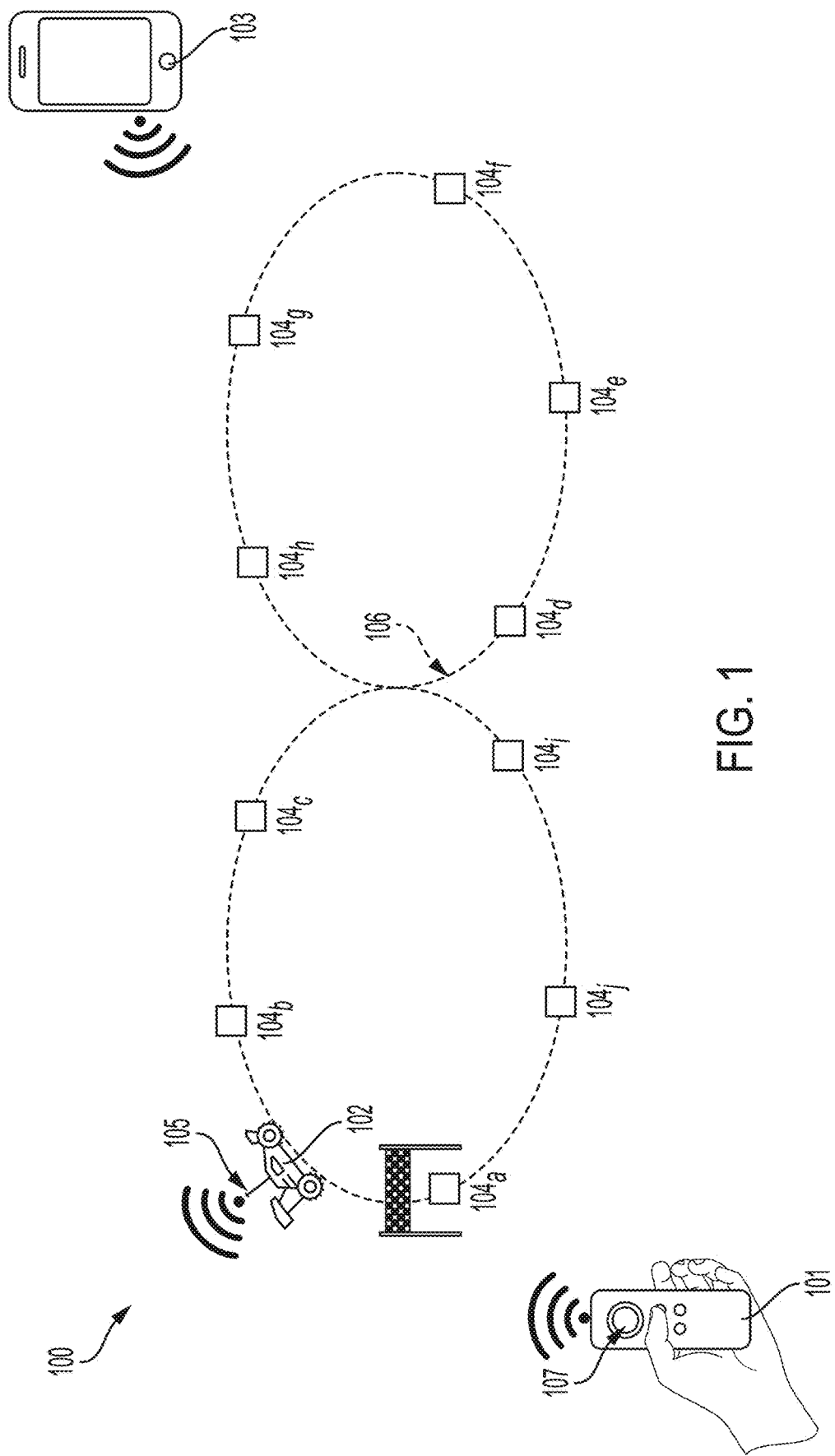
FIG. 1 illustrates a block diagram of a system configured to enhance the gameplay of a toy according to at least one non-limiting aspect of the present disclosure.

Referring now to FIG. 1, a system diagram of a system 100 configured to enhance the gameplay of a toy 102 is depicted in accordance with at least one non-limiting aspect of the present disclosure. According to the non-limiting aspect of FIG. 1, the system 100 can include a toy 102 configured to be controlled by a user via a remote control 101, a mobile computing device 103, and a plurality of markers $104_{a\text{-}j}$. For example, the toy 102 can be a remote controlled vehicle, such as a remote controlled car. However, according to other non-limiting aspects, the toy 102 can be other types of remote controlled vehicles, such as a remote controlled boat, or a remote controlled airplane. It shall be further appreciated that, although the system 100 of FIG. 1 can be implemented to enhance the gameplay of a toy 102, in still other non-limiting aspects, the system 100 can be implemented for non-recreational purposes. For example, in some non-limiting aspects, what is depicted as a remotely controlled toy 102 in FIG. 1 is an autonomous drone and the system 100 can be implemented to help the drone autonomously navigate an environment. To that end, the toy 102 preferably includes a power source (e.g., a battery) and a propulsion system (e.g., motor, drivetrain and/or wheels for land vehicle; and motor and propellers for aircraft). Furthermore, the remote control 101 and the mobile computing device(s) 103 may be either multiple separate devices or combined into one single system. According to other non-limiting aspects, separate remote control and/or combined computational controlled gameplay can be implemented by one or more sub-systems (e.g., remote control 101, mobile computing device(s) 103, etc.).

Still referring to FIG. 1, the remote control 101 and the mobile computing device 103 can be communicably coupled to the remote controlled vehicle 102. For example, the remote control 101 can include a transmitter configured to transmit—or a transceiver configured to transmit and receive—radio waves and signals, and thus, can communicate with the remote controlled vehicle 102 wirelessly. According to the non-limiting aspect of FIG. 1, the remote control 101 can be a small, handheld device that can include a user interface 107 (e.g., buttons, control pad, joystick, triggers, touchscreen, etc.). The remote control 101 can generate a command in response to a user input provided via the user interface 107 and the transmitter (or transceiver) can transmit a signal that corresponds to the user command to a receiver 105 (or transceiver) coupled to the remotely controlled vehicle 102.

According to some non-limiting aspects, the remote control 101 of FIG. 1 can be alternately and/or additionally configured to communicate with the remote controlled vehicle 102 via Wifi, Bluetooth, NFC, and/or a cellular network, amongst other known means of wireless communication. Regardless, the remote control 101 of FIG. 1 can enable the user to remotely issue commands (e.g., acceleration/deceleration and navigation/steering commands) to the vehicle 102 and thus, the remote control 101 can be used to remotely control the vehicle 102 as it traverses a course 106. The remote control 101 can further include a power source configured to power the generation and transmission of the signal, such as an alkaline battery or a lithium ion battery, a nickel-cadmium battery, and/or a nickel-metal hydride battery, amongst others. The power source can be either rechargeable or replaceable. Similarly, the remotely controlled vehicle 102 can include its own power source to power the receiver 105 and other vehicle controls.

According to other non-limiting aspects, the mobile computing device 103 can be configured to control the remote controlled vehicle 102 in lieu of the remote control 101. For example, a mobile application and/or a web-based application can be accessed via the mobile computing device 103, which can include a graphical user interface for the remotely controlled vehicle 105 when launched on the mobile computing device 103. For example, according to some non-limiting aspects, a mobile application and/or a web-based application accessed via the mobile computing device 103 can include any of the graphical interfaces $700_{a\text{-}f}$ described in reference to FIGS. 7A-7F, amongst others.

In further reference to FIG. 1, the plurality of markers $104_{a\text{-}j}$ can be used to define a user-configurable course 106 for the remotely controlled vehicle 102 to traverse. For example, the remotely controlled vehicle 102 can include an RFID reader 502 (FIG. 5A) and each marker $104_{a\text{-}j}$ of the plurality can include an RFID tag 508 (FIG. 5B), which can generate a signal configured to be detected by the RFID reader 502 (FIG. 5A) coupled to the remotely controlled vehicle 102. A user of the system can position or locate (or lay-out) the markers $104_{a\text{-}j}$ according to a user-configured preference to thereby establish a user-design course or lay-out for the vehicle 102 to follow. Each marker $104_{a\text{-}j}$ can be dimensionally configured in accordance with user preference and/or intended application. For example, according to the non-limiting aspect of FIG. 1, each marker 104-$j$ can be relatively small, lightweight and/or low-profile, such that the markers $104_{a\text{-}j}$ can be easily transported, arranged, and rearranged, and do not obstruct the motion of the vehicle 102 as it traverses the course defined by the markers 104. However, according to some non-limiting aspects, one or more markers $104_{a\text{-}j}$ of the plurality can be larger and include multiple RFID tags 508 (FIG. 5B), such that it can be more easily detected by the RFID reader 502 (FIG. 5A) on the remotely controlled vehicle 102.

Each marker $104_{a\text{-}j}$ of the plurality can be either actively, passively, or semi-actively configured, depending on user preference and/or intended application. For example, one or more markers $104_{a\text{-}j}$ can be actively configured, meaning the RFID tag 508 (FIG. 5B) includes its own power source (e.g., a lightweight battery) configured to run the RFID circuitry and broadcast the signal. Alternately and/or additionally, one or more markers $104_{a\text{-}j}$ can be passively configured, meaning the RFID tag 508 (FIG. 5B) has no battery and draws power from the RFID reader 502. Alternately and/or additionally, one or more markers $104_{a\text{-}j}$ can be semi-passively configured, meaning the RFID tag 508 (FIG. 5B) uses a battery to run the RFID circuitry, but transmits the signal by drawing power from the reader. A particular combination of markers $104_{a\text{-}j}$ with active, passive, or semi-passive RFID tags 508 (FIG. 5B) can be selected in view of power and/or cost requirements for the overall system 100, as well as the programmed function of a particular marker $104_{a\text{-}j}$ in the overall gameplay facilitated by the system 100, as will be discussed in reference to FIG. 3. In one preferential aspect, the markers $104_{a\text{-}j}$ can be configured with RFID tags 508 (FIG. 4) with low power requirements, which would require fewer on-board components (e.g., power source) and further can facilitate a low-profile and transportability of each marker $104_{a\text{-}j}$. Accordingly, passive or semi-passive markers $104_{a\text{-}j}$ may be appropriate. Thus, the RFID reader 508 (FIG. 5B) can be coupled to a power source on the radio controlled vehicle 102, which will will already have its own power source for transmitter and/or vehicle controls, leading to a less expensive system 100.

Figure 2:
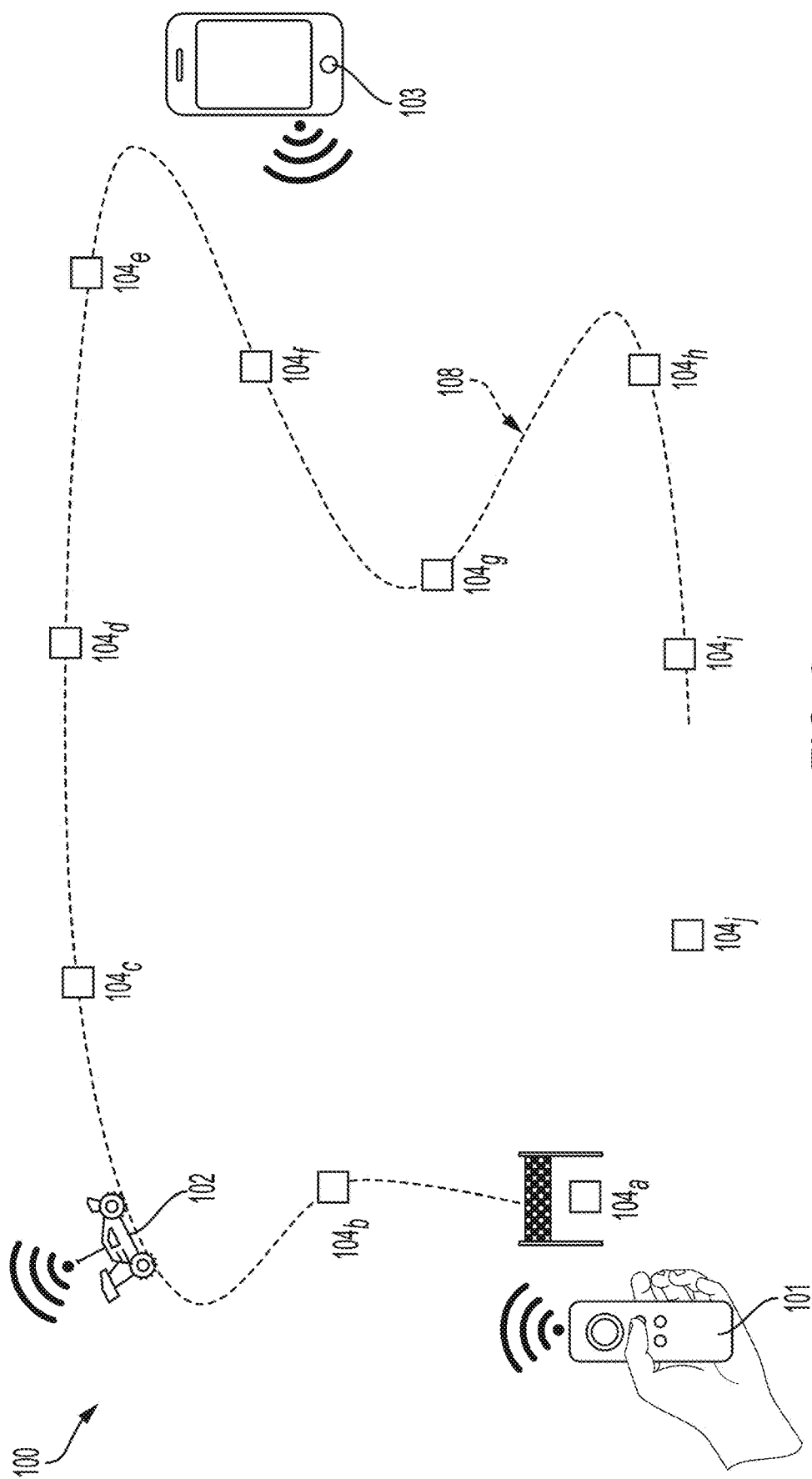
FIG. 2 illustrates a block diagram of the system of FIG. 1 according to another non-limiting aspect of the present disclosure.
Figure 3:
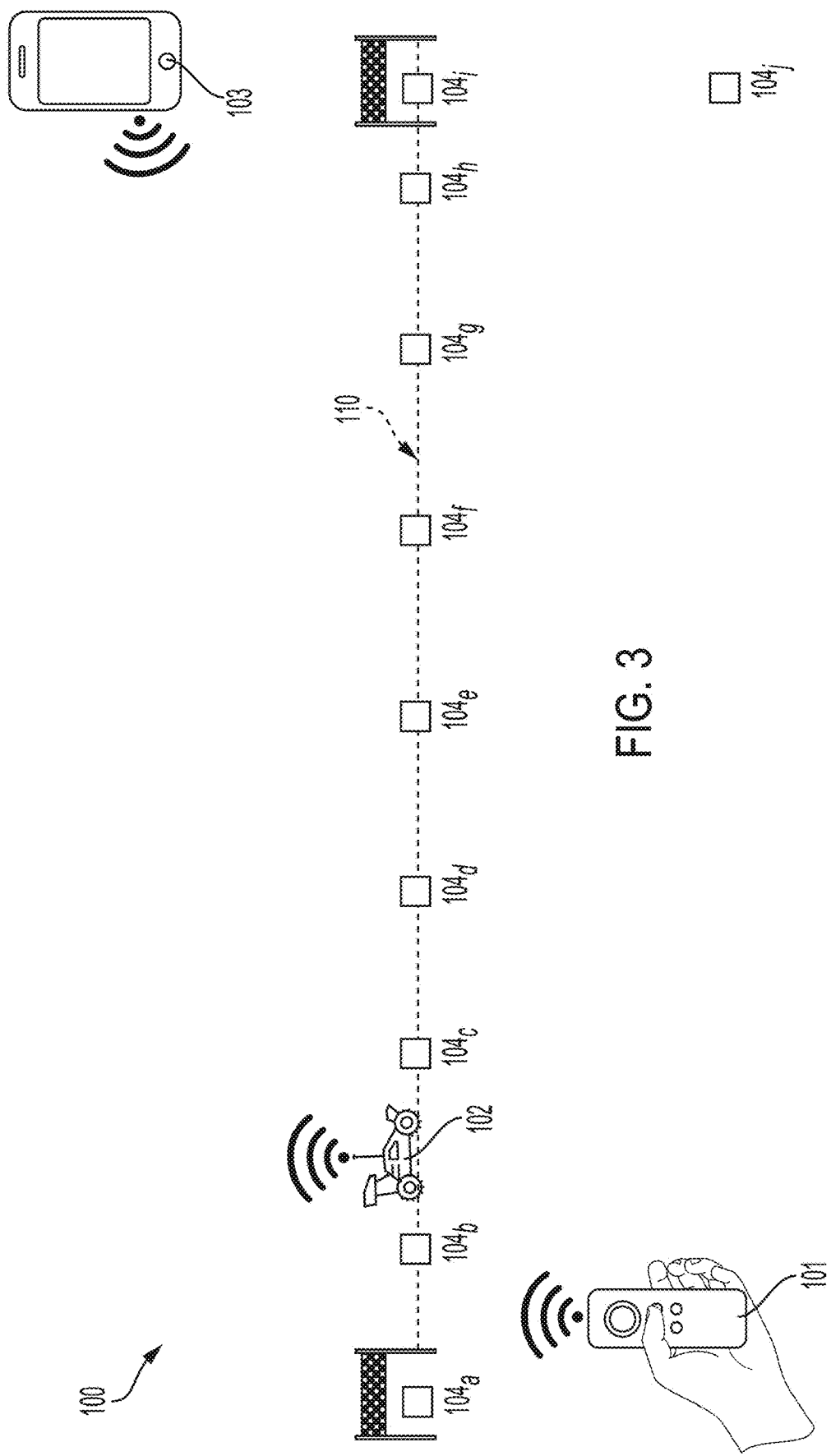
FIG. 3 illustrates a block diagram of the system of FIG. 1 according to another non-limiting aspect of the present disclosure.

According to the non-limiting aspect of FIG. 1, the plurality of markers $104_{a\text{-}j}$ can be easily and intentionally arranged to define a course 106 of a particular configuration. For example, the course 106 of FIG. 1 has a "figure-eight" configuration. However, it shall be appreciated that course 106 of FIG. 1 is non-limiting and that the plurality of markers $104_{a\text{-}j}$ can be alternately arranged to create courses of any desired geometric configuration, as depicted in FIGS. 2 and 3, for example. The system 100 can be used to define a course that is either circuitous or linear. For example, the courses 106, 108 of FIGS. 1 and 2 are circuitous, meaning the same marker $104_a$ can be designated as a starting line or a finish line. The marker $104_a$ can be designated as such via a graphical interface of a mobile application and/or a web-based application that is accessed via the mobile computing device 103. For example, according to some non-limiting aspects, the system 100 can employ a graphical interface such as the interfaces $700_{a-f}$ of FIGS. 7A-7F, which are described in further detail below. The rest of the markers $104_{b-j}$ can be laid out sequentially in a desired path, represented as course 106, for the remotely controlled vehicle 102 to traverse. The course 106 terminates in the designated finish line $104_a$ of the course 106.

Still referring to FIG. 1, a user can use the remote control 101 to control the remotely controlled vehicle 102 from the marker $104_a$ designated the starting line of the course 106, to the second marker $104_b$, from the second marker 104; to the third marker $104_c$, and so on, until the remotely controlled vehicle 102 passes marker $104_a$, which has also been designated as the finish line, a desired number of times (e.g. laps). According to some non-limiting aspects, the desired number of laps can be predetermined and programmed into a gameplay mode of the remotely controlled vehicle 102 via a graphical interface of a mobile application and/or a web-based application that is accessed via the mobile computing device 103. As the remotely controlled vehicle 102 traverses the course, the RFID reader 502 (FIG. 5A) will detect the signals being transmitted by each of the markers $104_{a-j}$. Since the remotely controlled vehicle 102 is communicably coupled to the mobile computing device 103, a user may review certain metrics (e.g., total elapsed time, splits between laps, splits between markers $104_{a-j}$, number of missed markers $104_{a-j}$, number of detected markers $104_{a-j}$, earned points, etc.) associated with the remotely controlled vehicle 102 as it traverses the course via a graphical user interface of a mobile application and/or web-based application launched on the mobile computing device 103. According to other non-limiting aspects, the remotely controlled vehicle 102 can be communicably coupled to a remote server, which can receive and process signals from the transmitter 105 (or transceiver) of the remotely controlled vehicle 102. As such, a user may review certain metrics associated with the remotely controlled vehicle 102 as it traverses the course via a graphical user interface of a mobile application and/or web-based application that is communicably coupled to the remote server. Additionally, metrics can be stored via the mobile computing device 103 and/or remote server and accessed for future review.

According to some non-limiting aspects, gameplay can be enhanced such that the game (or course 106) cannot be completed until the remotely controlled vehicle 102—and more specifically, the RFID reader 502 (FIG. 5A)—sequentially detects a signal transmitted by every marker $104_{a-j}$ on the course 106 for each of the desired, predetermined, and/or programmed number of laps. In other words, if the user failed to control the remotely controlled vehicle 102 such that it detected a signal transmitted by one of the markers $104_{a-j}$ on the course 106, the user would have to turn the remotely controlled vehicle 102 around and try again until the missed signal is detected. This would give competing users an advantage, as they could proceed to as many markers subsequent $104_{a-j}$ as is possible while the user loops back. According to some non-limiting aspects, the user's metrics can be displayed in comparison to another user's metrics, or the same user's metrics from a previous race via a graphical user interface of a mobile application and/or web-based application launched on the mobile computing device 103.

Metrics

Moreover, the lightweight markers $104_{a-j}$ of FIG. 1 can be easily rearranged such that the course 106 can be reconfigured any number of times. Such flexibility can further enable users to design courses that include innumerable features and/or physical obstacles (e.g., trees, tunnels, tight turns, ramps, hybrid indoor/outdoor sections, etc.) The only real limitation is the user's imagination. For example, the same system 100 can be used to define a "figure-eight" course 106, the winding course 108 of FIG. 2, or the "drag-race," straight-away course 110 of FIG. 3. According to the non-limiting aspect of FIG. 3, a first marker $104_a$ can be designated a starting line of the course 110 and a second marker $104_i$ can be designated a finish line of the course 110. The markers $104_a$, $104_i$ can be designated a starting line and finish line, respectively, via a graphical interface of a mobile application and/or a web-based application that is accessed via the mobile computing device 103. Alternately, a user can use the course 110 of FIG. 3 but designate each marker $104_{a-i}$ for a "suicide" gameplay. In other words, the markers $104_{a-i}$ can be designated such that the RFID reader 502 (FIG. 5A) must detect each non-starting line marker $104_{b-i}$ incrementally, while returning to and detecting the starting line marker $104_a$ in between each non-starting line marker $104_{b-i}$.

Additionally, the course 110 of FIG. 3 does not utilize one marker $104_j$ of the plurality, illustrating how any number of markers $104_{a-j}$ can be used to construct the course 103. For example, according to one non-limiting aspect, two markers of the plurality of markers $104_{a-j}$ can be used to construct a relay-style, "there-and-back" course, where users control a remotely controlled vehicle 102 between points but can take many creative routes between the designated, two markers of the plurality of markers $104_{a-j}$. As such, the system 100 of FIGS. 1-3 enable a user to creatively construct an infinite number of courses, far exceeding the number of courses programmed into a conventional video game. Additionally, the system 100 of FIGS. 1-3 enable a user have fun as they creatively design their own courses. As such, the system 100 of FIGS. 1-3 enhance the gameplay of a conventional, remotely controlled vehicle 102.

Referring now to FIG. 4, another block diagram of the system 100 of FIG. 1 is depicted in accordance with at least one non-limiting aspect of the present disclosure. According to the non-limiting aspect of FIG. 4, one or more markers $104_c$, $104_i$ can be designated as special via a graphical interface of a mobile application and/or a web-based application that is accessed via the mobile computing device 103. For example, a first special marker $104_c$ can be designated as a "bonus" and a second special marker $104_i$ can be designated as a "hazard." A user can be incentivized (e.g., via bonus points) to control the remotely controlled vehicle 102 such that the RFID reader 502 (FIG. 5A) detects a signal transmitted by the RFID tag 508 (FIG. 5B) on the "bonus" marker $104_c$. A user can be incentivized (e.g., via deducted points) to control the remotely controlled vehicle 102 such that the RFID reader 502 (FIG. 5A) does not detect a signal transmitted by the RFID tag 508 (FIG. 5B) on the "hazard" marker $104_i$. According to some non-limiting aspects, the vehicle 102 can include a processor 504 (FIG. 5A) communicably coupled to the RFID reader 502 (FIG. 5A) and, upon receiving a signal transmitted by either of the markers $104_c$, $104_i$ designated as special, the processor 504 (FIG. 5A) can cause the vehicle 102 to speed up, slow down, stop, reverse, and/or spin out. In other embodiments, the vehicle 102 can include lights and/or speakers and, upon receiving a signal transmitted by either of the markers $104_c$, $104_i$, the processor 504 (FIG. 5A) can cause the lights to illuminate and/or the speakers to play to a sound effect (e.g., a horn). Accordingly, the system 100 of FIG. 1 can enable the designation of special markers $104_c$, $104_i$, which further enhance the gameplay of a conventional toy, such as a remotely controlled vehicle 102.

According to still other non-limiting aspects, the remotely controlled vehicles themselves can be outfitted with one or more RFID tags 508 (FIG. 5B) configured to be detected by the RFID reader 502 (FIG. 5), such that competing vehicles 102 can interact with each other on the course 106. For example, an RFID tag 508 (FIG. 5) can be coupled to the front of a first vehicle 102 and an RFID reader 502 (FIG. 5) can be coupled to the back of a second vehicle. Thus, as the front of the first vehicle gets close enough to the back of the second vehicle, the RFID reader 502 (FIG. 2) on the back of the second vehicle can detect a signal transmitted by the RFID tag 508 (FIG. 5) of the first vehicle 102. When this signal is transmitted to the mobile computing device 103 (or remote server), the user of the first vehicle 102 can be awarded points. Alternately, the second vehicle can include a processor 504 (FIG. 5A) communicably coupled to the RFID reader 502 (FIG. 5A) on its back and, upon receiving the transmitted signal, the processor 504 (FIG. 5A) can cause the second vehicle to slow down, stop, reverse, and/or spin out. In other embodiments, the second vehicle can include lights and/or speakers and, when the RFID reader 502 (FIG. 5) of the second vehicle receives a signal transmitted by the RFID tag 508 (FIG. 5) of the first vehicle 102, the processor 504 (FIG. 5A) of the second vehicle can cause the lights to illuminate and/or the speakers to play to a sound effect (e.g., a horn). Accordingly, the system 100 of FIG. 1 can enable interactions between users, such as the "rear-ending" interaction described above.

Figure 5B:
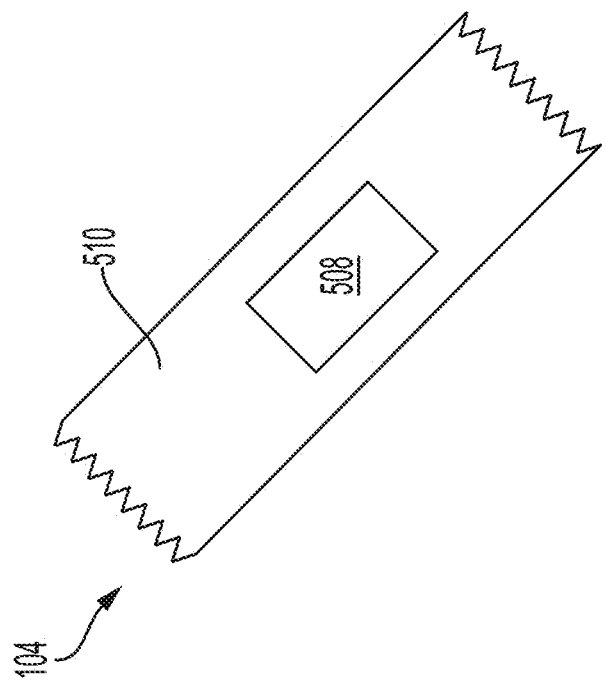
FIGS. 5A and 5B illustrate block diagrams of a toy and a marker, respectively, according to at least one non-limiting aspect of the present disclosure.

Of course, similar functionality can be employed via technology that does not include an RFID reader 502 (FIG. 5A) or an RFID tag 508 (FIG. 5B). According to other non-limiting aspects, the implementing technology can be much simpler. For example, according to some non-limiting aspects, optical technologies (e.g., infrared, or visible light emitting diodes), other proximity sensing technologies (e.g., magnetic, radio frequency, Bluetooth, transmitters, receivers, transceivers, etc.), and/or ultrasonic technologies, amongst others can be implemented such that competing vehicles 102 can interact with each other on the course 106.

Figure 5A:
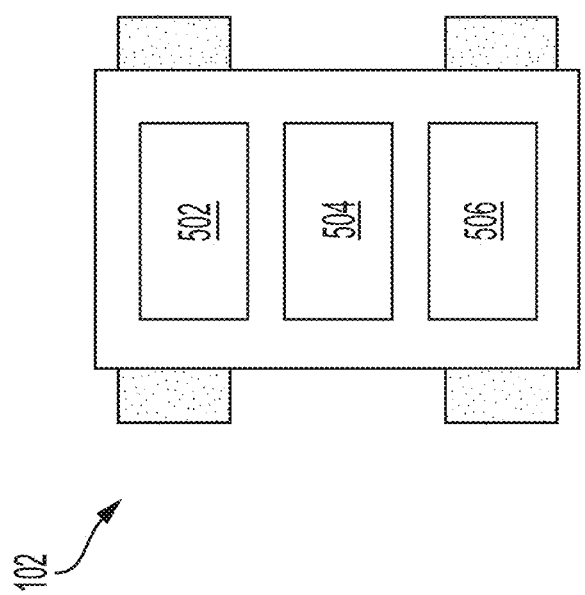

Referring now to FIGS. 5A and 5B, block diagrams of a remotely controlled vehicle 102 and a marker 104 are depicted, respectively, according to at least one non-limiting aspect of the present disclosure. According to the non-limiting aspect of FIG. 5A, a toy 102, such as the remotely controlled vehicle 102 can include an RFID reader 502, a controller (e.g., a processor, a microprocessor, a logic-based controller), and/or other miscellaneous on-board electronics 506, such as memory, and/or a sensor (e.g., optical sensor, proximity sensor, etc.), amongst other electronic components. Furthermore, a marker 104, such as any marker of the plurality of markers $104_{a-j}$ of FIGS. 1-3, can include an RFID tag 508 coupled to a low-profile substrate 510. For example, the substrate 510 can be rigid and configured with stakes such that it can be secured to the ground. Alternately, the substrate 510 can have an adhesive side such that it can be adhered to the ground. In other non-limiting aspects, the substrate is weighted such that it can be pinned to the ground. Regardless, the substrate 510 and RFID tag 508 should have a relatively low profile (e.g., height) such that the toy 102 can clear it while traversing the course. Thus, the RFID reader 502 will have an easier ability detecting signals transmitted by the RFID tag 508.

Figure 6:
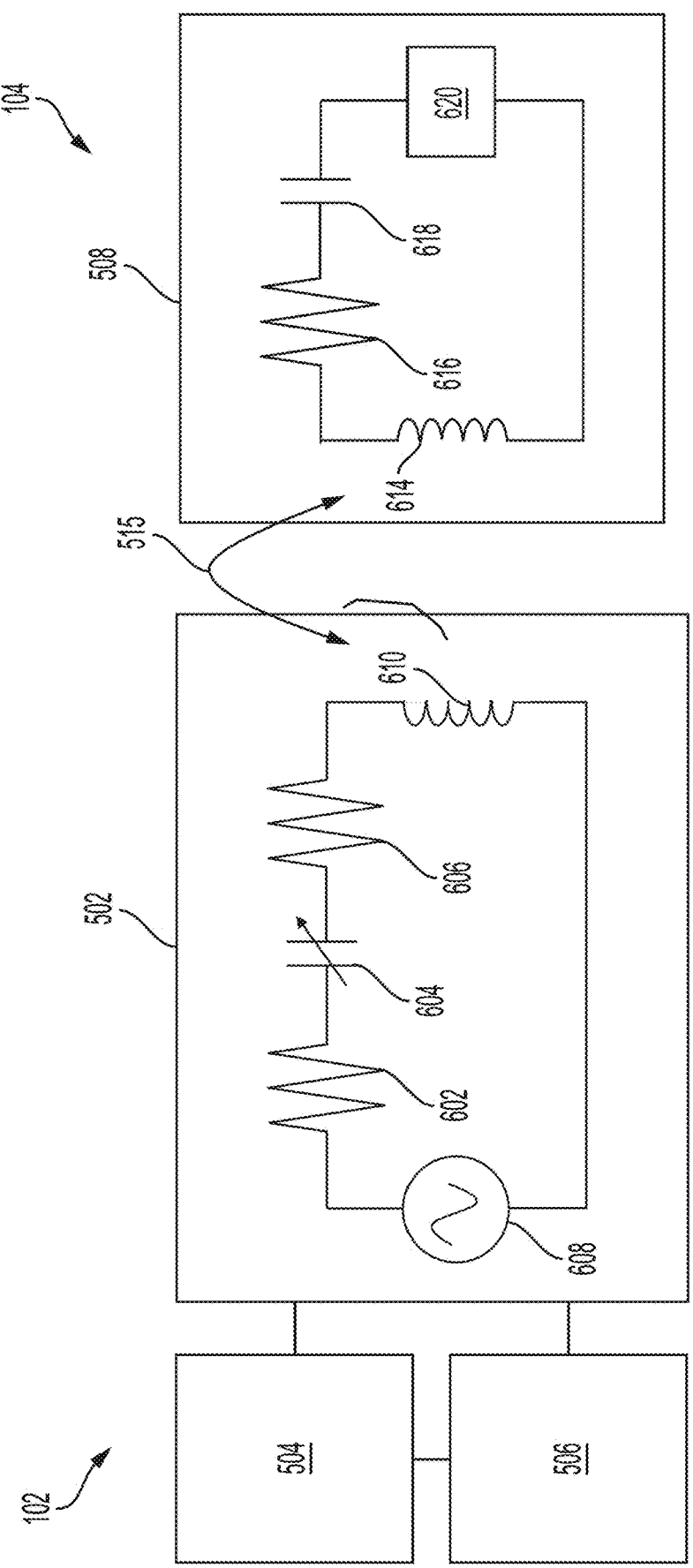
FIG. 6 illustrates circuit diagrams of the toy of FIG. 5A and the marker of FIG. 5B according to at least one non-limiting aspect of the present disclosure.

Referring now to FIG. 6 a circuit diagram of the toy 102 of FIG. 5A is depicted according to at least one non-limiting aspect of the present disclosure. According to the non-limiting aspect of FIG. 6, the RFID reader 502 can include a resistive ("R"), inductive ("L"), and capacitive ("C") circuit, or equivalent circuit elements or collectively an "RLC" circuit or "RLC" equivalent circuit elements, that detect low-power radio frequencies to collect and store data, in this case, data associated with a marker 104. For example, the RFID reader 502 can include an inductive antenna 610 capable of generating a current in response to an inductive load generated by an corresponding antenna 514 of the RFID tag 508. The RFID reader 502 circuit can further include a power source 608, which can further power the remotely controlled vehicle 102. The RFID reader 502 can further include one or more resistors 602, 606 for signal filtering and a capacitor 604 for coupling, since capacitors offer greater reactance at the lower frequencies generated by the RFID tag 508. According to some non-limiting aspects, the RFID tag 508 can further include computational components and/or memory storage elements, such as a unique and/or programmable identification code.

In further reference to FIG. 6, a circuit diagram of the marker 104 of FIG. 5A is depicted according to at least one non-limiting aspect of the present disclosure. According to the non-limiting aspect of FIG. 6B, the RFID tag 508 can include an inductive antenna 614 capable of transmitting a low-power radio frequency signal. The RFID reader 502 circuit can further include a radio frequency integrated circuit 620, which can be any analog circuit that usually run in the frequency range of 3 kHz to 6 GHz (3,000 hertz to 6 billion hertz). The RFID tag 508 can further include one or more resistors 618 and a coupling capacitor 618 configured for frequency coupling with the capacitor 604 of the RFID reader 502. Of course, the circuits of FIG. 6 are simplified and merely illustrative. The present disclosure contemplate other non-limiting aspects feature RFID readers 502 and tags 508 with a variety of other circuits configured to perform the operations described herein.

It shall be further appreciated that, according to some non-limiting aspects, both the RFID tag 508—which can include "passive" electronics with no battery or power source—and the RFID reader 502 circuit—which can include active electronics powered by a power source, such as a battery—can include transceivers. In other words, according to such aspects, both the RFID tag 508 and the and the RFID reader 502 can be configured to transmit and receive data. For example, the actively powered RFID reader 502 can, generally, first query the passive RFID tag 508 via an RF transmission as it passes near and/or over the tag 508. The RF query or request signal from the RFID reader 502 can include sufficient RF energy to power the passive RFID tag 508 circuitry. This power can enables the passive RFID tag's 508 reception and/or transmission of data and can ultimately allow the passive RFID tag 508 to send information/data back to the active RFID reader 502, thereby answering the query's request for useful data.

According to other non-limiting aspects, the toy is not limited to a remotely controlled vehicle. For example, the toy can be a non-motorized toy, such as a bicycle, a skateboard, a pair of roller skates, a jump rope, a frisbee, a football, a baseball, shoes, sneakers, wearable or adhesive electronic attachment, etc. Regardless, it shall be appreciated how the devices, systems, and methods disclosed herein can enhance the gameplay associated with such toys. Any of these toys can be outfitted with a particularly configured reader 502 and used in conjunction with the markers 104$_{a\text{-}j}$ of FIG. 1. For example, a the markers 104$_{a\text{-}j}$ of FIG. 1 can be arranged to form a bike track or a path for roller rink. Alternately and/or additionally, the markers 104$_{a\text{-}j}$ of FIG. 1 can be arranged to measure how far a skateboarder launches off of a ramp, how far a baseball is hit, or a football or frisbee is thrown. These are non-limiting aspects that illustrate the flexibility and degree of customization enabled by the devices, systems, and methods disclosed herein.

Figure 7B:
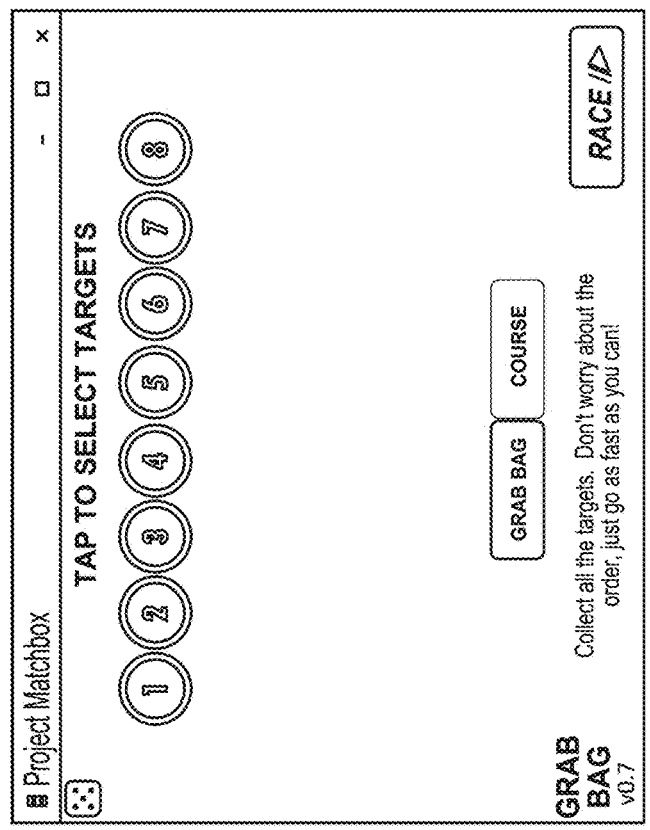
FIGS. 7A-7F illustrate several graphical user interfaces, according to several non-limiting aspects of the present disclosure.
Figure 7A:
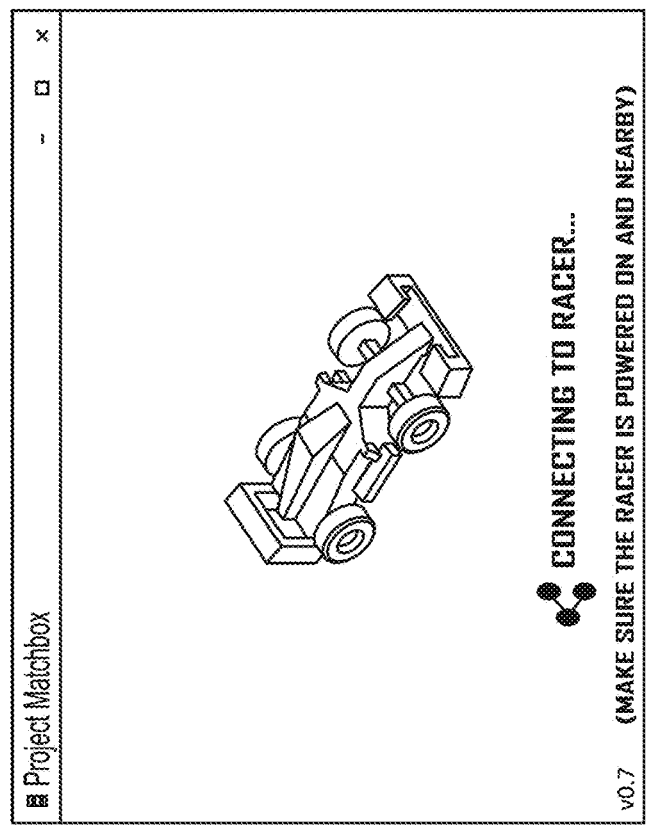

Referring now to FIGS. 7A-7F, FIGS. several graphical user interfaces 700$_{a\text{-}f}$ are depicted in accordance with several non-limiting aspects of the present disclosure. According to some non-limiting aspects, the graphical user interfaces 700$_{a\text{-}f}$ of FIGS. 7A-7F can be accessed via a mobile application and/or a web-based application launched by the mobile computing device 103 of FIGS. 1-4. The graphical user interface 700 illustrates that the software is attempting to establish a connection with the remotely controlled vehicle 102 (FIGS. 1-4), and is encouraging the user to confirm that the remotely controlled vehicle (FIGS. 1-4) is connected and nearby. The graphical user interface 700$_b$ of FIG. 7B is prompting the user to select one or more markers 104 (FIGS. 1-4) to include in the programmable gameplay, and enables the user to select either a "grab bag" or "course" gameplay. According to the non-limiting aspect of FIG. 7B, the "grab bag" gameplay has been selected, and the graphical user interface 700$_b$ is informing the user that all of the selected targets need to be collected as fast as the user can, in any order.

Figure 7D:
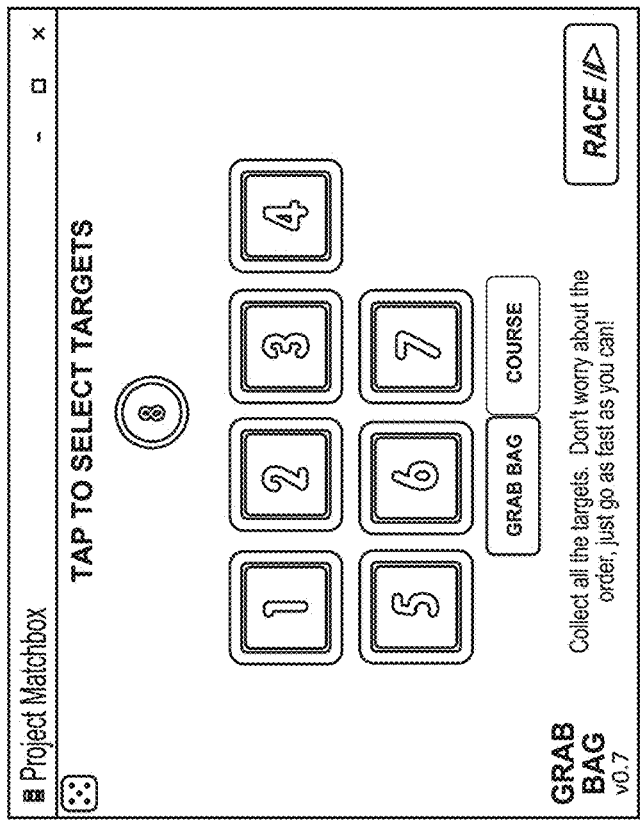
Figure 7C:
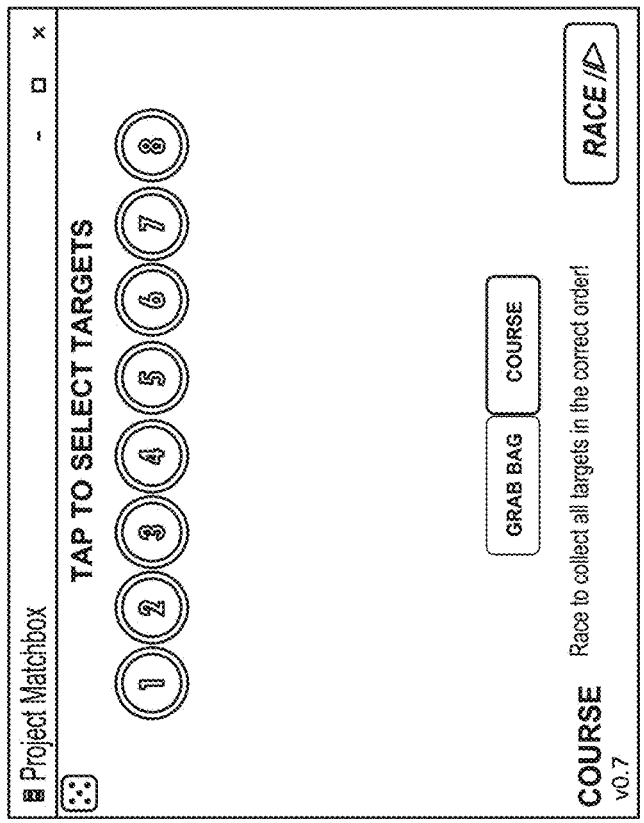

The graphical user interface 700$_c$ of FIG. 7C is similar to the graphical user interface 700$_b$ of FIG. 7B, in that it is also prompting the user to select one or more markers 104 (FIGS. 1-4) to include in the programmable gameplay. However, according to the non-limiting aspect of FIG. 7C, the "course" gameplay has been selected, and the graphical user interface 700$_c$ is informing the user that all of the selected targets need to be collected as fast as the user can, in the correct order. The graphical user interface 700 of FIG. 7D is similar to the graphical user interfaces 700$_b$ of FIG. 7B in that the "grab bag" gameplay has been selected, but it illustrates that the user has selected one or more markers 104 (FIGS. 1-4) to include in the game. The unselected markers 104 (FIGS. 1-4) are in the upper portion of the graphical user interface 700$_d$ and the selected markers are in the middle of the graphical user interface 700$_d$.

Figure 7F:
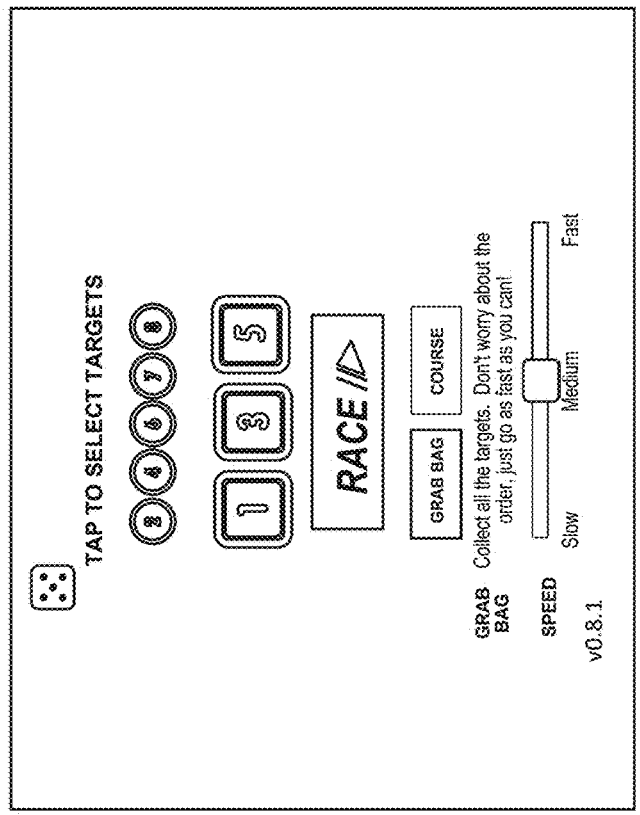
Figure 7E:
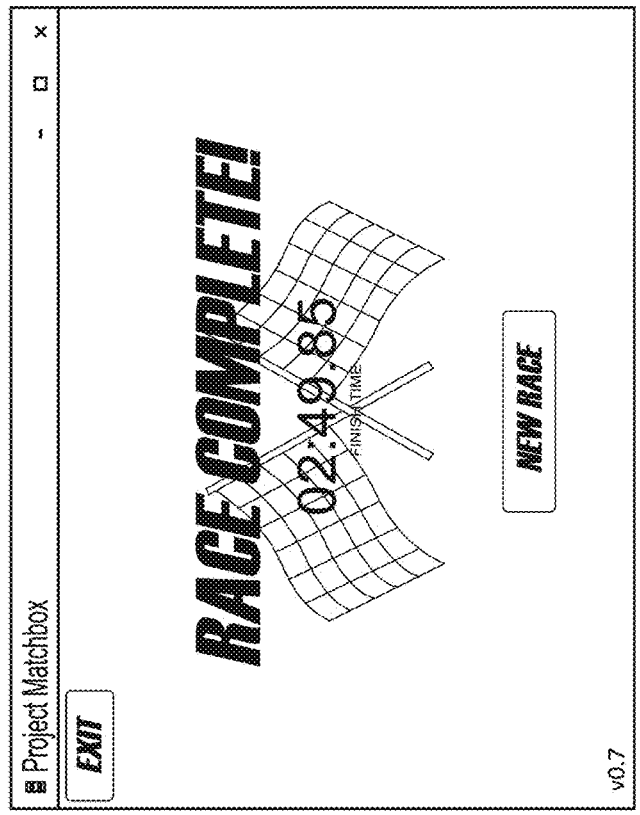

The graphical user interface 700$_e$ of FIG. 7E indicates that the race has been completed, and displays the elapsed time it took for the user to collect each of the markers 104 (FIGS. 1-4) in accordance with the programmed gameplay. Alternately, the graphical user interface 700$_e$ of FIG. 7E can further include a total number of points earned by the user and/or other racers throughout the course of the game. A poll position can be further displayed and/or means to collect textual, audio, and/or video inputs from the user for transmission to the other racers. The graphical user interface 700$_f$ of FIG. 7F is similar to the graphical user interface 700$_a$ of FIG. 7D, but includes a widget by which the user can select a "speed" level for the game.

Various aspects of the subject matter described herein are set out in the following numbered clauses:

Clause 1: A system including: a plurality of markers, wherein each marker of the plurality includes a radio frequency identification ("RFID") tag configured to generate a signal, and wherein the plurality of markers are spatially arranged according to a user-defined course; a remote control vehicle, wherein the vehicle includes a RFID reader configured to detect the signal generated by the RFID tag of each marker of the plurality as the vehicle moves around the course; and a computing device communicably coupled to the vehicle, wherein the computing device is configured to access an application configured to: define a sequence by which the RFID reader must detect each signal generated by each RFID tag of each marker of the plurality of markers based on a user input provided via a user interface of the application, such that the sequence defines a path for the vehicle through the course; determine that the RFID reader has detected each signal generated by each RFID tag of each marker of the plurality of markers in accordance with the defined sequence; and determine that the vehicle has completed the path for the course based on the determination that the RFID reader has detected each signal generated by each RFID tag of each marker of the plurality of markers in accordance with the defined sequence.

Clause 2. The system according to clause 1, wherein the vehicle further includes: a propulsion system; a processor communicably coupled to the propulsion system; and a power source configured to provide electrical power to the RFID reader, and the processor, and the propulsion system.

Clause 3. The system according to either clause 1 or 2, wherein the application is further configured to: designate a first marker of the plurality as a starting line for the course that begins the sequence, based on a second user input provided via the user interface of the application; designate a second marker of the plurality as a finish line for the course that ends the sequence, based on a third user input provided via the user interface of the application; and designate a third marker of the plurality as a special marker based on a fourth user input provided via the user interface of the application.

Clause 4. The system according to any of clauses 1-3, wherein, upon detecting the signal generated by the RFID tag of the special marker, the processor is configured to initiate a sound effect played via a speaker of the vehicle or illuminate a light of the vehicle and/or cause the propulsion system of the vehicle to cause the vehicle to speed up, slow down, stop, reverse, or spin out.

Clause 5. The system according to any of clauses 1-4, further including a second vehicle including a second RFID reader configured to detect the signal generated by the RFID tag of each marker of the plurality, wherein the application is further configured to: determine that the second RFID reader has detected each signal generated by each RFID tag of each marker of the plurality of markers in accordance with the defined sequence; and determine that the second vehicle has completed the path for the course faster than the vehicle based on the determination that the second RFID reader has detected each signal generated by each RFID tag of each marker of the plurality of markers in accordance with the defined sequence.

Clause 6. The system according to any of clauses 1-5, wherein the second vehicle further includes an RFID tag configured to generate a signal, and wherein, upon detecting the signal generated by the RFID tag of the second vehicle, the processor is configured to initiate a sound effect played via a speaker of the vehicle or illuminate a light of the vehicle and/or cause the propulsion system of the vehicle to cause the vehicle to speed up, slow down, stop, reverse, or spin out.

Clause 7. The system according to any of clauses 1-6, wherein the RFID tag of at least one marker of the plurality is passive and configured to generate and transmit the signal in response to the RFID reader of the vehicle passing over it.

Clause 8. The system according to any of clauses 1-7, wherein the RFID tag of at least one marker of the plurality is semi-passive and includes a light-weight power source, wherein the RFID tag of the at least one marker is configured to generate the signal in response to electrical power received from the light-weight power source, and wherein the RFID tag of the at least one marker is further configured to transmit the signal in response to the RFID reader of the vehicle passing over it.

Clause 9. The system according to any of clauses 1-8, wherein the RFID tag of at least one marker of the plurality of markers includes a light-weight power source, and wherein the RFID tag of the at least one marker is active and configured to generate and transmit the signal in response to electrical power received from the light-weight power source.

Clause 10. The system according to any of clauses 1-9, wherein the application is further configured to: define a number of times the RFID reader must detect each signal generated by each RFID tag of each marker of the plurality of markers in accordance with the defined sequence, based on a second user input provided via the user interface of the application; determine that the RFID has detected each signal generated by each RFID tag of each marker of the plurality of markers in accordance with the defined sequence the defined number of times; and determine that the vehicle has completed a course a required number of times based on the determination that the RFID has detected each signal generated by each RFID tag of each marker of the plurality of markers in accordance with the defined sequence the defined number of times.

Clause 11. The system according to any of clauses 1-10, wherein the plurality of markers are configured to be rearranged, and wherein the application is further configured to: define, via the user interface of the application, a second sequence by which the RFID reader must detect the signal generated by the RFID tag of each marker of the plurality, such that the second sequence defines a second path for the vehicle through a second course; determine that the RFID reader has detected each signal generated by each RFID tag of each marker of the plurality of markers in accordance with the defined second sequence; and determine that the vehicle has completed the path for the second course based on the determination that the RFID reader has detected each signal generated by each RFID tag of each marker of the plurality of markers in accordance with the defined second sequence.

Clause 12. A system including: a plurality of markers, wherein each marker of the plurality includes a radio frequency identification ("RFID") tag configured to generate a signal, and wherein the plurality of markers are spatially arranged according to a user-defined course; a computing device configured to be communicably coupled to a remote controlled vehicle including a RFID reader configured to detect the signal generated by the RFID tag of each marker of the plurality, wherein the computing device is configured to access an application configured to: define a sequence by which the RFID reader must detect each signal generated by each RFID tag of each marker of the plurality of markers based on a user input provided via a user interface of the application, such that the sequence defines a path for the vehicle through the course; determine that the RFID reader has detected each signal generated by each RFID tag of each marker of the plurality of markers in accordance with the defined sequence; and determine that the vehicle has completed the path for the course based on the determination that the RFID reader has detected each signal generated by each RFID tag of each marker of the plurality of markers in accordance with the defined sequence.

Clause 13. The system according to clause 12, wherein the application is further configured to: designate a first marker of the plurality as a starting line for the course that begins the sequence, based on a second user input provided via the user interface of the application; designate a second marker of the plurality as a finish line for the course that ends the sequence, based on a third user input provided via the user interface of the application; and designate a third marker of the plurality as a special marker based on a fourth user input provided via the user interface of the application.

Clause 14. The system according to either of clauses 12 or 13, wherein, upon detecting the signal generated by the RFID tag of the special marker, the processor is configured to initiate a sound effect played via a speaker of the vehicle or illuminate a light of the vehicle and/or cause a propulsion system of the vehicle to cause the vehicle to speed up, slow down, stop, reverse, or spin out.

Clause 15. The system according to any of clauses 12-14, wherein the application is further configured to: define a number of times the RFID reader must detect each signal generated by each RFID tag of each marker of the plurality of markers in accordance with the defined sequence, based on a second user input provided via the user interface of the application; determine that the RFID has detected each signal generated by each RFID tag of each marker of the plurality of markers in accordance with the defined sequence the defined number of times; and determine that the vehicle has completed a course a required number of times based on the determination that the RFID has detected each signal generated by each RFID tag of each marker of the plurality of markers in accordance with the defined sequence the defined number of times.

Clause 16. The system according to any of clauses 12-15, wherein the plurality of markers are configured to be rearranged, and wherein the application is further configured to: define, via the user interface of the application, a second sequence by which the RFID reader must detect the signal generated by the RFID tag of each marker of the plurality, such that the second sequence defines a second path for the vehicle through a second course; determine that the RFID reader has detected each signal generated by each RFID tag of each marker of the plurality of markers in accordance with the defined second sequence; and determine that the vehicle has completed the second path for the second course based on the determination that the RFID reader has detected each signal generated by each RFID tag of each marker of the plurality of markers in accordance with the defined second sequence.

Clause 17. The system according to any of clauses 12-16, wherein the computing device is further configured to be communicably coupled to a second remote controlled vehicle including a second RFID reader configured to detect the signal generated by the RFID tag of each marker of the plurality, and wherein the application is further configured to: determine that the second RFID reader has detected each signal generated by each RFID tag of each marker of the plurality of markers in accordance with the defined sequence; and determine that the second remote controlled vehicle has completed the course faster than the remote controlled vehicle based on the determination that the second RFID reader has detected each signal generated by each RFID tag of each marker of the plurality of markers in accordance with the defined sequence.

Clause 18. A method for enhancing gameplay of a remote controlled vehicle via a plurality of markers, wherein each marker of the plurality includes a radio frequency identification ("RFID") tag configured to generate a signal, wherein the plurality of markers are spatially arranged according to a user-defined course, and wherein the remote controlled vehicle includes a RFID reader configured to detect the signal generated by the RFID tag of each marker of the plurality, the method including: defining, via an application accessed via a computing device, a sequence by which the RFID reader must detect each signal generated by each RFID tag of each marker of the plurality based on a user input provided via a user interface of the application, such that the sequence defines a path for the vehicle through the course; determining, via the application, that the RFID reader has detected each signal generated by each RFID tag of each marker of the plurality of markers in accordance with the defined sequence; and determining, via the application, that the vehicle has completed the path for the course based on the determination that the RFID reader has detected each signal generated by each RFID tag of each marker of the plurality of markers in accordance with the defined sequence.

Clause 19. The system according to clause 18, wherein the plurality of markers are configured to be rearranged, the method further including: defining, via the application, a second sequence by which the RFID reader must detect a signal generated by the RFID tag of each marker of the plurality based on a second user input provided via the user interface of the application, such that the second sequence defines a second path for the vehicle through a second course; determining, via the application, that the RFID reader has detected each signal generated by each RFID tag of each marker of the plurality of markers in accordance with the defined second sequence; and determining, via the application, that the vehicle has completed the second path for the second course based on the determination that the RFID reader has detected each signal generated by each RFID tag of each marker of the plurality of markers in accordance with the defined second sequence.

Clause 20. The method according to either of clauses 18 or 19, further including: determining, via the application, that a second RFID reader of a second remote controlled vehicle has detected each signal generated by each RFID tag of each marker of the plurality of markers in accordance with the defined sequence; and determining, via the application, that the second remote controlled vehicle has completed the path for the course faster than the remote controlled vehicle based on the determination that the second RFID reader has detected each signal generated by each RFID tag of each marker of the plurality of markers in accordance with the defined sequence.

Clause 21. A method of playing a game with a remote control vehicle via a plurality of markers, wherein each marker of the plurality includes a radio frequency identification ("RFID") tag configured to generate a signal, and wherein the remote controlled vehicle includes a RFID reader configured to detect the signal generated by the RFID tag of each marker of the plurality the method including: arranging spatially the plurality of markers according to a user-defined course; defining, via an application accessed via a computing device, a sequence by which the RFID reader must detect each signal generated by each RFID tag of each marker of the plurality based on a user input provided via a user interface of the application, such that the sequence defines a path for the vehicle through the course; after arranging the markers according to the course and defining the path, controlling, by the user, the remote control vehicle along the path, such that controlling the vehicle includes: remotely controlling the vehicle such that the RFID reader has detected each signal generated by each RFID tag of each marker of the plurality of markers in accordance with the defined sequence; tracking, via the application, the vehicle's progress through the path for the course based on the RFID reader's detection of each signal generated by each RFID tag of each marker; and determining, via the application, that the vehicle has completed the path for the course based on the determination that the RFID reader has detected each signal generated by each RFID tag of each marker of the plurality of markers in accordance with the defined sequence.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system comprising:
    a plurality of markers, wherein each marker of the plurality comprises a radio frequency identification ("RFID") tag configured to generate a signal, and wherein the plurality of markers are spatially arranged according to a user-defined course;
    a remote control vehicle, wherein the vehicle comprises a RFID reader configured to detect the signal generated by the RFID tag of each marker of the plurality as the vehicle moves around the course; and
    a computing device communicably coupled to the vehicle and comprising an application that:
    defines a sequence by which the RFID reader must detect each signal generated by each RFID tag of each marker of the plurality of markers based on a user input provided via a user interface of the application, such that the sequence defines a path for the vehicle through the course;
    determines that the RFID reader has detected each signal generated by each RFID tag of each marker of the plurality of markers in accordance with the defined sequence;
    determines that the vehicle has completed the path for the course based on the determination that the RFID reader has detected each signal generated by each RFID tag of each marker of the plurality of markers in accordance with the defined sequence; and
    provides a graphical user interface configured to designate each marker of the plurality of markers to perform a specific function associated with the course.

2. The system of claim 1, wherein the vehicle further comprises:
    a propulsion system;
    a processor communicably coupled to the propulsion system; and a power source configured to provide electrical power to the RFID reader, the processor, and the propulsion system.

3. The system of claim 2, wherein the application is further configured to:
designate a first marker of the plurality as a starting line for the course that begins the sequence, based on a second user input provided via the user interface of the application;
designate a second marker of the plurality as a finish line for the course that ends the sequence, based on a third user input provided via the user interface of the application; and
designate a third marker of the plurality as a special marker based on a fourth user input provided via the user interface of the application.

4. The system of claim 3, wherein, upon detecting the signal generated by the RFID tag of the special marker, the processor is configured to initiate a sound effect played via a speaker of the vehicle or illuminate a light of the vehicle and/or cause the propulsion system of the vehicle to cause the vehicle to speed up, slow down, stop, reverse, or spin out.

5. The system of claim 2, further comprising a second vehicle comprising a second RFID reader configured to detect the signal generated by the RFID tag of each marker of the plurality, wherein the application is further configured to:
determine that the second RFID reader has detected each signal generated by each RFID tag of each marker of the plurality of markers in accordance with the defined sequence; and
determine that the second vehicle has completed the path for the course faster than the vehicle based on the determination that the second RFID reader has detected each signal generated by each RFID tag of each marker of the plurality of markers in accordance with the defined sequence.

6. The system of claim 5, wherein the second vehicle further comprises an RFID tag configured to generate a signal, and wherein, upon detecting the signal generated by the RFID tag of the second vehicle, the processor is configured to initiate a sound effect played via a speaker of the vehicle or illuminate a light of the vehicle and/or cause the propulsion system of the vehicle to cause the vehicle to speed up, slow down, stop, reverse, or spin out.

7. The system of claim 2, wherein the RFID tag of at least one marker of the plurality is passive and configured to generate and transmit the signal in response to the RFID reader of the vehicle passing over it.

8. The system of claim 2, wherein the RFID tag of at least one marker of the plurality is semi-passive and comprises a light-weight power source, wherein the RFID tag of the at least one marker is configured to generate the signal in response to electrical power received from the light-weight power source, and wherein the RFID tag of the at least one marker is further configured to transmit the signal in response to the RFID reader of the vehicle passing over it.

9. The system of claim 1, wherein the RFID tag of at least one marker of the plurality of markers comprises a light-weight power source, and wherein the RFID tag of the at least one marker is active and configured to generate and transmit the signal in response to electrical power received from the light-weight power source.

10. The system of claim 1, wherein the application is further configured to:
define a number of times the RFID reader must detect each signal generated by each RFID tag of each marker of the plurality of markers in accordance with the defined sequence, based on a second user input provided via the user interface of the application;
determine that the RFID has detected each signal generated by each RFID tag of each marker of the plurality of markers in accordance with the defined sequence the defined number of times; and
determine that the vehicle has completed a course a required number of times based on the determination that the RFID has detected each signal generated by each RFID tag of each marker of the plurality of markers in accordance with the defined sequence the defined number of times.

11. The system of claim 1, wherein the plurality of markers are configured to be rearranged, and wherein the application is further configured to:
define, via the user interface of the application, a second sequence by which the RFID reader must detect the signal generated by the RFID tag of each marker of the plurality, such that the second sequence defines a second path for the vehicle through a second course;
determine that the RFID reader has detected each signal generated by each RFID tag of each marker of the plurality of markers in accordance with the defined second sequence; and
determine that the vehicle has completed the path for the second course based on the determination that the RFID reader has detected each signal generated by each RFID tag of each marker of the plurality of markers in accordance with the defined second sequence.

12. The system of claim 1, wherein the graphical user interface of the application is configured to designate one or more markers of the plurality of markers a bonus marker, and wherein bonus points are awarded when the RFID reader of the vehicle detects a signal generated by the bonus marker.

13. The system of claim 1, wherein the graphical user interface of the application is configured designate one or more markers of the plurality of markers a hazard marker, and wherein points are deducted when the RFID reader of the vehicle detects a signal generated by the hazard marker.

14. The system of claim 1, wherein the remote control vehicle further comprises an RFID tag, and wherein an interaction between the vehicle and a competing vehicle is initiated when an RFID reader of the competing vehicle detects a signal generated by the RFID tag of the vehicle.

15. The system of claim 14, wherein the interaction comprises the vehicle and/or the competing vehicle slowing down, stopping, reversing, or spinning out.

16. The system of claim 14, wherein the interaction comprises activation of a light or sound via the vehicle and/or the competing vehicle.

17. The system of claim 1, wherein the graphical user interface of the application is configured re-designate reach marker of the plurality of markers to perform different functions associated with the course.

18. A system, the system comprising:
a plurality of markers, wherein each marker of the plurality comprises a radio frequency identification ("RFID") tag configured to generate a signal, and wherein the plurality of markers are spatially arranged according to a user-defined course;
a computing device configured to be communicably coupled to a remote controlled vehicle comprising a RFID reader configured to detect the signal generated by the RFID tag of each marker of the plurality, wherein the computing device comprises an application that:
defines a sequence by which the RFID reader must detect each signal generated by each RFID tag of each marker of the plurality of markers based on a user input provided via a user interface of the application, such that the sequence defines a path for the vehicle through the course;
determines that the RFID reader has detected each signal generated by each RFID tag of each marker of the plurality of markers in accordance with the defined sequence; and
determines that the vehicle has completed the path for the course based on the determination that the RFID reader has detected each signal generated by each RFID tag of each marker of the plurality of markers in accordance with the defined sequence; and
provides a graphical user interface configured to designate each marker of the plurality of markers to perform a specific function associated with the course.

19. The system of claim 18, wherein the application is further configured to:
designate a first marker of the plurality as a starting line for the course that begins the sequence, based on a second user input provided via the user interface of the application;
designate a second marker of the plurality as a finish line for the course that ends the sequence, based on a third user input provided via the user interface of the application; and
designate a third marker of the plurality as a special marker based on a fourth user input provided via the user interface of the application.

20. The system of claim 19, wherein, upon detecting the signal generated by the RFID tag of the special marker, a processor of the vehicle is configured to initiate a sound effect played via a speaker of the vehicle or illuminate a light of the vehicle and/or cause a propulsion system of the vehicle to cause the vehicle to speed up, slow down, reverse, stop, or spin out.

21. The system of claim 18, wherein the application is further configured to:
define a number of times the RFID reader must detect each signal generated by each RFID tag of each marker of the plurality of markers in accordance with the defined sequence, based on a second user input provided via the user interface of the application;
determine that the RFID has detected each signal generated by each RFID tag of each marker of the plurality of markers in accordance with the defined sequence the defined number of times; and
determine that the vehicle has completed a course a required number of times based on the determination that the RFID has detected each signal generated by each RFID tag of each marker of the plurality of markers in accordance with the defined sequence the defined number of times.

22. The system of claim 18, wherein the plurality of markers are configured to be rearranged, and wherein the application is further configured to:
define, via the user interface of the application, a second sequence by which the RFID reader must detect the signal generated by the RFID tag of each marker of the plurality, such that the second sequence defines a second path for the vehicle through a second course;
determine that the RFID reader has detected each signal generated by each RFID tag of each marker of the plurality of markers in accordance with the defined second sequence; and
determine that the vehicle has completed the second path for the second course based on the determination that the RFID reader has detected each signal generated by each RFID tag of each marker of the plurality of markers in accordance with the defined second sequence.

23. The system of claim 18, wherein the computing device is further configured to be communicably coupled to a second remote controlled vehicle comprising a second RFID reader configured to detect the signal generated by the RFID tag of each marker of the plurality, and wherein the application is further configured to:
determine that the second RFID reader has detected each signal generated by each RFID tag of each marker of the plurality of markers in accordance with the defined sequence; and
determine that the second remote controlled vehicle has completed the course faster than the remote controlled vehicle based on the determination that the second RFID reader has detected each signal generated by each RFID tag of each marker of the plurality of markers in accordance with the defined sequence.

24. A method for enhancing gameplay of a remote controlled vehicle via a plurality of markers, wherein each marker of the plurality comprises a radio frequency identification ("RFID") tag configured to generate a signal, wherein the plurality of markers are spatially arranged according to a user-defined course, and wherein the remote controlled vehicle comprises a RFID reader configured to detect the signal generated by the RFID tag of each marker of the plurality, the method comprising:
providing, via an application accessed via a computing device, a graphical user interface configured to designate each marker of the plurality of markers to perform a specific function associated with the course;
defining, via user inputs provided via the graphical user interface provided by the application accessed via the computing device, a sequence by which the RFID reader must detect each signal generated by each RFID tag of each marker of the plurality based on a user input provided via a user interface of the application, such that the sequence defines a path for the vehicle through the course;
determining, via the application, that the RFID reader has detected each signal generated by each RFID tag of each marker of the plurality of markers in accordance with the defined sequence; and
determining, via the application, that the vehicle has completed the path for the course based on the determination that the RFID reader has detected each signal generated by each RFID tag of each marker of the plurality of markers in accordance with the defined sequence.

25. The method of claim 24, wherein the plurality of markers are configured to be rearranged, the method further comprising:
defining, via additional user inputs provided via the graphical user interface provided by the application, a second sequence by which the RFID reader must detect the signal generated by the RFID tag of each marker of the plurality based on a second user input provided via the user interface of the application, such that the second sequence defines a second path for the vehicle through a second course;

determining, via the application, that the RFID reader has detected each signal generated by each RFID tag of each marker of the plurality of markers in accordance with the defined second sequence; and determining, via the application, that the vehicle has completed the second path for the second course based on the determination that the RFID reader has detected each signal generated by each RFID tag of each marker of the plurality of markers in accordance with the defined second sequence.

26. The method of claim 24, further comprising:

determining, via the application, that a second RFID reader of a second remote controlled vehicle has detected each signal generated by each RFID tag of each marker of the plurality of markers in accordance with the defined sequence; and determining, via the application, that the second remote controlled vehicle has completed the path for the course faster than the remote controlled vehicle based on the determination that the second RFID reader has detected each signal generated by each RFID tag of each marker of the plurality of markers in accordance with the defined sequence.

27. A method of playing a game with a remote control vehicle via a plurality of markers, wherein each marker of the plurality comprises a radio frequency identification ("RFID") tag configured to generate a signal, and wherein the remote controlled vehicle comprises a RFID reader configured to detect the signal generated by the RFID tag of each marker of the plurality the method comprising:

arranging spatially the plurality of markers according to a user-defined course;

defining, via a graphical user interface displayed via an application accessed via a computing device, a sequence by which the RFID reader must detect each signal generated by each RFID tag of each marker of the plurality based on a user input provided via a user interface of the application, such that the sequence defines a path for the vehicle through the course;

designating, via the graphical user interface, at least one marker of the plurality of markers to perform a specific function associated with the course;

after arranging the markers according to the course, defining the path, and designating the at least one marker of the plurality of markers, controlling, by the user, the remote control vehicle along the path, such that controlling the vehicle comprises:

remotely controlling the vehicle such that the RFID reader has detected each signal generated by each RFID tag of each marker of the plurality of markers in accordance with the defined sequence;

tracking, via the application, progress of the vehicle through the path for the course based on the RFID reader's detection of each signal generated by each RFID tag of each marker; and determining, via the application, that the vehicle has completed the path for the course based on the determination that the RFID reader has detected each signal generated by each RFID tag of each marker of the plurality of markers in accordance with the defined sequence.

* * * * *